United States Patent
Nakamura (10) Patent No.: US 11,130,316 B2
(45) Date of Patent: Sep. 28, 2021

(54) LAMINATED GLASS

(71) Applicant: AGC Inc., Chiyoda-ku (JP)

(72) Inventor: Atsushi Nakamura, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 67 days.

(21) Appl. No.: 16/195,067

(22) Filed: Nov. 19, 2018

(65) Prior Publication Data

US 2019/0084277 A1 Mar. 21, 2019

Related U.S. Application Data

(63) Continuation of application No. PCT/JP2017/018901, filed on May 19, 2017.

(30) Foreign Application Priority Data

May 25, 2016 (JP) .............................. JP2016-103999

(51) Int. Cl.
*B32B 17/10* (2006.01)
*B60J 1/00* (2006.01)
(Continued)

(52) U.S. Cl.
CPC .. *B32B 17/10761* (2013.01); *B32B 17/10036* (2013.01); *B32B 17/10605* (2013.01);
(Continued)

(58) Field of Classification Search
CPC ........ B32B 17/10036; B32B 17/10605; B32B 17/10761; B32B 2250/05;
(Continued)

(56) References Cited

U.S. PATENT DOCUMENTS

2012/0263958 A1 10/2012 Iwamoto et al.
2014/0227489 A1 8/2014 Inui
(Continued)

FOREIGN PATENT DOCUMENTS

CN 103781741 5/2014
EP 2 752 396 A1 7/2014
(Continued)

OTHER PUBLICATIONS

International Search Report dated Aug. 8, 2017 in PCT/JP2017/018901, filed on May 19, 2017 (with English Translation).
(Continued)

*Primary Examiner* — Callie E Shosho
*Assistant Examiner* — Krupa Shukla
(74) *Attorney, Agent, or Firm* — Oblon, McClelland, Maier & Neustadt, L.L.P.

(57) ABSTRACT

Laminated glass includes: a first and a second glass plate facing each other, and an intermediate film disposed between the glass plates and including a plurality of core layers and a plurality of skin layers alternately laminated. The plurality of core layers and the plurality of skin layers contain a polyvinyl acetal resin and a plasticizer. The plurality of core layers has a glass transition point of lower than 15° C., and the plurality of skin layers has a glass transition point of 15° C. or higher. The plurality of core layers includes three or more core layers. The plasticizer has a surface density of 0.3 mg/mm$^2$ or more in the intermediate film and within 5-6 mm from an end of the intermediate film.

14 Claims, 2 Drawing Sheets

(51) Int. Cl.
    *B32B 27/08*     (2006.01)
    *B32B 27/22*     (2006.01)
    *B32B 27/30*     (2006.01)

(52) U.S. Cl.
    CPC .............. *B32B 27/08* (2013.01); *B32B 27/22* (2013.01); *B32B 27/30* (2013.01); *B60J 1/00* (2013.01); *B32B 2250/05* (2013.01); *B32B 2250/246* (2013.01); *B32B 2250/40* (2013.01); *B32B 2307/102* (2013.01); *B32B 2605/006* (2013.01); *B32B 2605/08* (2013.01); *B60J 1/001* (2013.01)

(58) Field of Classification Search
    CPC .......... B32B 2250/246; B32B 2250/40; B32B 2307/102; B32B 2307/718; B32B 2605/006; B32B 2605/08; B32B 27/08; B32B 27/22; B32B 27/30; B32B 7/027
    See application file for complete search history.

(56) References Cited

U.S. PATENT DOCUMENTS

2014/0355107 A1\* 12/2014 Taima ............... B32B 17/10633
                                                             359/359
2015/0125656 A1\* 5/2015 Chen ....................... B32B 27/22
                                                             428/141
2016/0121584 A1   5/2016 Iwamoto et al.
2017/0225435 A1\* 8/2017 Hirano ............. B32B 17/10761

FOREIGN PATENT DOCUMENTS

| | | |
|---|---|---|
| JP | 62-37148 | 2/1987 |
| JP | 5-104687 | 4/1993 |
| JP | 2012-101999 | 5/2012 |
| JP | 5850993 | 2/2016 |
| WO | WO 2012/050078 A1 | 4/2012 |
| WO | WO 2013/031884 A1 | 3/2013 |
| WO | WO 2016/052672 A1 | 4/2016 |

OTHER PUBLICATIONS

Written Opinion dated Aug. 8, 2017 in PCT/JP2017/018901, filed on May 19, 2017.

\* cited by examiner

LAMINATED GLASS

CROSS-REFERENCE TO RELATED APPLICATIONS

This application is a continuation of prior International Application No. PCT/JP2017/018901, filed on May 19, 2017 which is based upon and claims the benefit of priority from Japanese Patent Application No. 2016-103999 filed on May 25, 2016; the entire contents of all of which are incorporated herein by reference.

FIELD

The present invention relates to laminated glass, and particularly to laminated glass provided with a high sound insulating property, and excellent in foaming resistance of an intermediate film in a peripheral edge portion.

BACKGROUND

A laminated glass is made by sandwiching an intermediate film made of resin or the like between a pair of glass plates and compressing them under heating. Since the laminated glass has safety without scattering of fragments when broken, it is widely used for, for example, window glass of a vehicle such as an automobile, window glass for a building, and the like. In addition to the safety such as scattering prevention, recent laminated glasses have various functions imparted by appropriately selecting the intermediate film. Among the functions, a sound insulating property is highly desired. So, an increase of sound insulating performance is attempted using an intermediate film including laminating resin films of different properties.

For example, Patent Reference 1 (JP-A 05-104687) mentions a sound insulating intermediate film made by laminating two kinds of layer (A) (however, a thickness is 0.05 mm or more) and layer (B) each containing a specific polyvinyl acetal resin and a plasticizer in a laminated constitution of layer (B)/layer (A)/layer (B). Laminated glass using the sound insulating intermediate film mentioned in Patent Reference 1 has a sound insulating property at a certain level or higher in a wide temperature range.

Further, Patent Reference 2 (JP-B 5850993) mentions an intermediate film having a three-layer laminated structure, in which a layer containing a specific polyvinyl butyral resin and a plasticizer is sandwiched by two layers each containing a thermoplastic resin and a plasticizer. Patent Reference 2 also mentions a technique for enhancing a sound insulating property by making a content ratio of the plasticizer of the one intermediate layer to the thermoplastic resin larger than those of the two layers on both sides.

However, such sound insulating intermediate films with the sound insulating property each have a larger plasticizer amount as the entire intermediate film compared with a normal single-layer intermediate film. In laminated glass using each of the intermediate films, the plasticizer is likely to scatter from an end face of each of the intermediate films. That easily causes a foaming phenomenon. The plasticizer has escaped in a predetermined range from an end portion toward the inside (peripheral edge portion) of each of the intermediate films and bubbles are left. Note that in Patent Reference 2, foaming is suppressed to some extent by using a high-molecular-weight polyvinyl butyral resin, which is not said to be sufficient.

Further, the bubbles generated in the peripheral edge portion of the intermediate film in the above-described laminated glass can be hidden by, for example, forming a black ceramic layer in a frame shape in the peripheral edge portion of the laminated glass, but in a case of window glass with a design having no black ceramic layer in a peripheral edge portion, a foam portion cannot be hidden. Furthermore, even though the foam portion can be hidden by the black ceramic layer, scattering of a plasticizer degrades sound insulating performance of a laminated glass peripheral edge portion.

SUMMARY

The present invention has been made from the above-described viewpoint, and is an object to provide laminated glass provided with a high sound insulating property, and excellent in foaming resistance of an intermediate film, particularly foaming resistance of an intermediate film in a peripheral edge portion.

Laminated glass of the present invention includes: a first and a second glass plate facing each other, and an intermediate film disposed between the glass plates and including a plurality of core layers and a plurality of skin layers alternately laminated. The plurality of core layers and the plurality of skin layers contain a polyvinyl acetal resin and a plasticizer. The plurality of core layers has a glass transition point of lower than 15° C., and the plurality of skin layers has a glass transition point of 15° C. or higher. The plurality of core layers includes three or more core layers. The plasticizer has a surface density of 0.3 mg/mm$^2$ or more in the intermediate film and within 5-6 mm from an end of the intermediate film.

According to the present invention, it is possible to provide laminated glass provided with a high sound insulating property, and excellent in foaming resistance of an intermediate film, particularly foaming resistance of an intermediate film in a peripheral edge portion.

DETAILED DESCRIPTION

Hereinafter, embodiments of the present invention will be described. It should be noted that the present invention is not limited to these embodiments, and these embodiments may be changed or modified without departing from the spirit and scope of the present invention.

Laminated glass of the present invention includes: a pair of glass plates facing each other; and an intermediate film sandwiched between the pair of glass plates and having a constitution as described below.

The above-described intermediate film is constituted by alternately laminating skin layers each containing a polyvinyl acetal resin and a plasticizer and each having a glass transition point of 15° C. or higher and core layers each containing a polyvinyl acetal resin and a plasticizer and each having a glass transition point of lower than 15° C., and has three or more core layers. Furthermore, in the above-described intermediate film, in a region between a position of 5 mm inside from an end portion and a position of 6 mm inside from the end portion, a plasticizer amount required as an amount per unit area of a principal surface of the intermediate film is 0.3 mg/mm$^2$ or more.

In this embodiment, an end portion means an edge line formed when a face and a face are joined, and a peripheral edge portion means a region having a certain width from an end portion of a face toward a center portion of the face. In an intermediate film, an end portion means an outer periphery of a principal surface of the intermediate film. In this embodiment, an outer periphery side when viewed from the center portion of the principal surface of the intermediate film is referred to as an outside, and a center portion side when viewed from the outer periphery is referred to as an inside. Meanings of terms of the end portion, the peripheral edge portion, the outside, and the inside are similar to those in a case of the intermediate film also in skin layers and core layers constituting the intermediate film, glass plates, and laminated glass.

The glass transition point in this embodiment means a peak temperature of tan δ when measuring the temperature dependency of tan δ (loss modulus/storage modulus) of a sample by a dynamic viscoelasticity test under conditions of a frequency of 1 Hz, a dynamic shear strain of 0.015%, a temperature increasing rate: 3° C./min, and a measured temperature range: −40° C. to 80° C.

tan δ can be measured by preparing a sample formed into, for example, a disk shape having a thickness d=0.6 mm and a diameter of 12 mm, and measuring the sample by a dynamic viscoelasticity measurement apparatus using a measuring jig: parallel plate (diameter of 12 mm) under the above-described conditions. The dynamic viscoelasticity measurement apparatus is, for example, Rotational Rheometer MCR301 manufactured by Anton Paar GmbH.

Further, the plasticizer amount per unit area in the principal surface of the intermediate film in this embodiment means a plasticizer amount [mg/mm$^2$] measured by the following method. In this embodiment, unless otherwise stated, the plasticizer amount of the intermediate film means the plasticizer amount [mg/mm$^2$] per unit area in the principal surface of the intermediate film.

By using tetrahydrofuran (THF) as a solvent, preparing a plurality of plasticizer-THF solutions each having a different content of a plasticizer. The obtained plasticizer-THF solutions are analyzed using gel permeation chromatography (GPC) to obtain a peak area of the plasticizer in each of the solutions. The peak area of the plasticizer with respect to a concentration of the plasticizer in each of the solutions is plotted on two-dimensional coordinates, to obtain an approximate straight line.

A sample of an intermediate film for measuring a plasticizer amount is cut along a face perpendicular to a principal surface in a range from a position of 5 mm to a position of 6 mm inside from an outer periphery of the principal surface of the intermediate film, namely from an end portion thereof, to be produced. A THF solution made by dissolving the sample in THF is GPC-measured, and a content of a plasticizer in the sample is found from the obtained peak area of the plasticizer and the above-described approximate straight line, to calculate the plasticizer amount [mg/mm$^2$] per unit area in the principal surface of the sample.

Note that a size of the sample in the above-described measurement is preferably about 5 mm$^3$. For example, in a case where a thickness of the intermediate film is 1 mm, when the sample is produced in a width of 1 mm in a range of 5 to 6 mm inside from the outer periphery of the principal surface, the sample with a volume of 5 mm$^3$ is obtained by being a length of 5 mm. Note that as long as the sample is in the range of 5 to 6 mm inside from the outer periphery of the principal surface, a width of the sample is not limited to 1 mm. For example, in a case where the thickness of the intermediate film is 1 mm similarly to the above, when the sample is produced in a width of 0.5 mm in the range of 5 to 6 mm inside from the outer periphery of the principal surface, the sample with a volume of 5 mm$^3$ is obtained by being a length of 10 mm. Further, the samples with a predetermined size may be each produced by cutting the sample along a face perpendicular to the principal surface in a range from a position of 5 mm to a position of 6 mm inside from an end portion of the principal surface for each of layers constituting the intermediate film, to calculate plasticizer amounts [mg/mm$^2$] of the layers by the above-described similar method and add them up.

Further, in the plasticizer amount of the intermediate film, in a case where a film thickness of the intermediate film is uniform in the principal surface, in the region between a position of 5 mm inside from an end portion of the intermediate film and a position of 6 mm inside from the end portion, it is sufficient that a plasticizer amount measured at one arbitrary place is 0.3 mg/mm$^2$ or more. A position at the one arbitrary place in the case is not particularly limited. Further, in a case where a film thickness of the intermediate film is not uniform in the principal surface, in the region between a position of 5 mm inside from an end portion of the intermediate film and a position of 6 mm inside from the end portion, a plasticizer amount measured at a portion where the film thickness is the smallest is set to 0.3 mg/mm$^2$ or more. Hereinafter, a region where the plasticizer amount [mg/mm$^2$] per unit area in the principal surface of the intermediate film in the present invention is measured is also referred to as a region (x).

In general, in the layers of the intermediate film, the plasticizer amount per unit volume is uniform in all of the layers. Accordingly, as long as a plasticizer amount measured at a portion where a film thickness is the smallest is 0.3 mg/mm$^2$ or more in the region between a position of 5 mm inside from an end portion of the intermediate film and a position of 6 mm inside from the end portion, the plasticizer amount in the region of the intermediate film becomes 0.3 mg/mm$^2$ or more at any place.

The intermediate film sandwiched between a pair of glass plates has the above-described constitution, and thereby, the laminated glass of the present invention has a high sound insulating property, and is excellent in foaming resistance of the intermediate film, particularly foaming resistance in the peripheral edge portion of the intermediate film. In a conventionally used intermediate film made by laminating three layers each containing a thermoplastic resin, particularly a polyvinyl acetal resin and a plasticizer, normally, improvement in a sound insulating property is made by adjusting a ratio of the mass of the plasticizer to the mass of the resin in each of the layers, resulting in a constitution having a large plasticizer amount in the intermediate film, thereby causing foaming of a peripheral edge portion. That is, it is difficult that the sound insulating property and the foaming resistance are compatible with each other.

The laminated glass of the present invention is constituted by laminating the core layers (a glass transition point is lower than 15° C.) and the skin layers (a glass transition point is 15° C. or higher), which each contain the polyvinyl acetal resin and the plasticizer and whose glass transition points are different, alternately and such that the number of core layers becomes three or more, thereby allowing suppression of the foaming at a high level while setting the plasticizer amount of the intermediate film measured in the above-described predetermined region to 0.3 mg/mm² or more, an amount allowing the sound insulating property to be sufficiently enhanced.

A mechanism of foaming suppression for the laminated glass of the present invention is not clarified, but it is considered that by alternately laminating at least five or more layers in total using the two kinds of layers, which each contain the polyvinyl acetal resin and the plasticizer and whose glass transition points are different, scattering of the plasticizer from an end face of the intermediate film is suppressed, and the plasticizer is supplied to portions where the plasticizer has been scattered, from the vicinity thereof, to suppress generation of bubbles. Further, it is considered that regarding the scattering of the plasticizer, a deterioration in the polyvinyl acetal resin due to ultraviolet radiation is regarded as one cause thereof, but the intermediate film having the above-described laminated constitution suppresses the deterioration in the polyvinyl acetal resin due to ultraviolet radiation, thereby allowing the scattering of the plasticizer from the end face of the intermediate film to be suppressed.

In the laminated glass of the present invention, a ratio of the mass of the intermediate film to the total mass of the intermediate film and the pair of glass plates is preferably 13 mass % or more, and more preferably 14 mass % or more. By being a constitution having the skin layers whose glass transition point is 15° C. or higher between at least three core layers (a glass transition point is lower than 15° C.) and setting the ratio of the mass of the intermediate film to the total mass of the intermediate film and the pair of glass plates to fall within the above-described range, vibrational energy of sound causes generation of large shear deformation energy at a plurality of points in the intermediate film between the pair of glass plates, and the shear deformation energy is released as heat energy, thereby allowing sound insulating performance to be exhibited.

In the laminated glass of the present invention, the ratio of the mass of the intermediate film to the total mass of the intermediate film and the pair of glass plates (hereinafter, simply also referred to as "intermediate film mass %") is further preferably 15 mass % or more, and particularly preferably 17 mass % or more from the viewpoints of a sound insulating property and reduction in weight. Further, it is preferably 50 mass % or less, and more preferably 40 mass % or less from the viewpoint of maintaining desired strength.

In the laminated glass of the present invention, a surface density is preferably 13.5 kg/m² or less, more preferably 12 kg/m² or less, and further preferably 11 kg/m² or less. As long as the surface density of the laminated glass falls within the above-described range, the reduction in weight of the laminated glass can be achieved. The surface density of the laminated glass of the present invention is preferably 8 kg/m² or more, and more preferably 9 kg/m² or more from the viewpoint of maintaining the desired strength.

Note that the intermediate film mass % and the surface density of the laminated glass are values to be measured as the entire sheet of laminated glass.

Figure 1A:
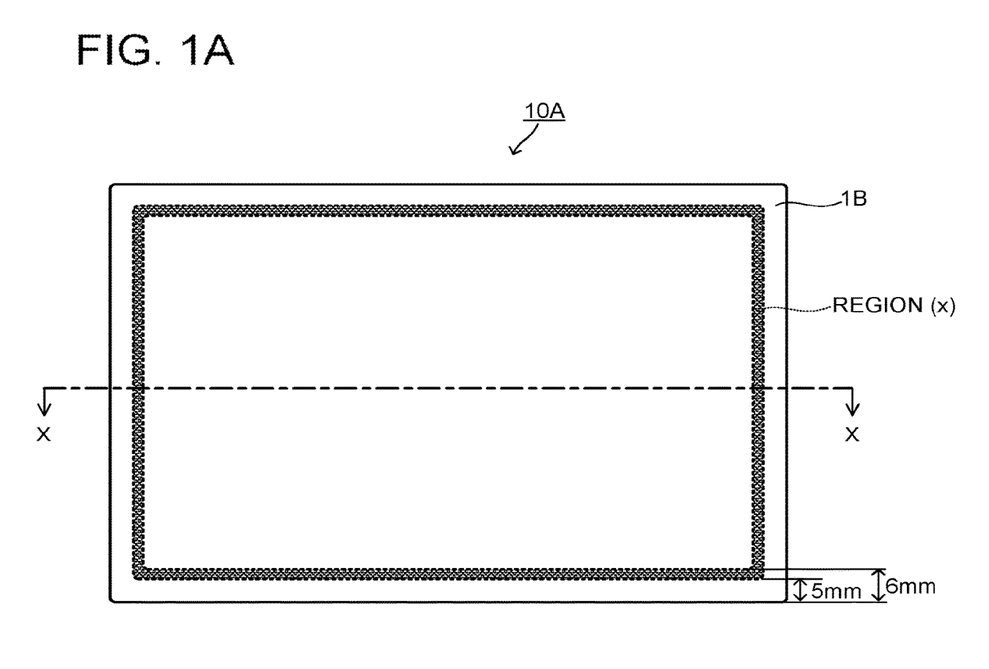
FIG. 1A is a front view of an example of an embodiment of laminated glass of the present invention.

Hereinafter, an embodiment of the laminated glass of the present invention will be explained with reference to the drawings while exemplifying a case of using a seven-layer laminated film made by alternately laminating three core layers and four skin layers as an intermediate film. FIG. 1A is a front view in an example of the embodiment of the laminated glass of the present invention using the seven-layer laminated film as the intermediate film, and FIG. 1B is a cross-sectional view taken along a line X-X of the laminated glass illustrated in FIG. 1A.

Figure 1B:
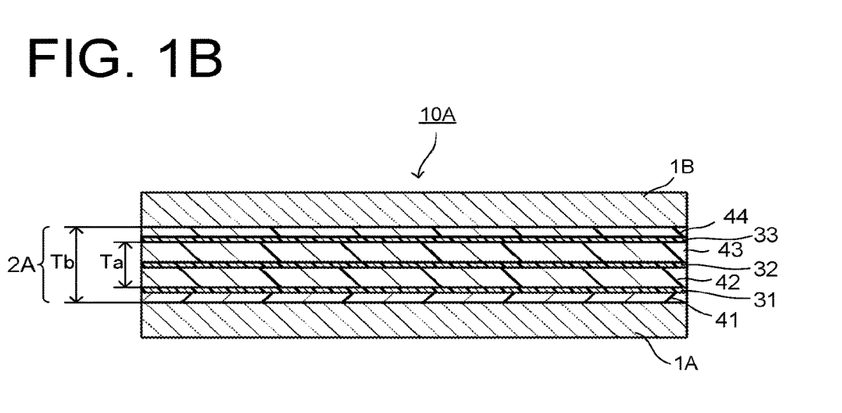
FIG. 1B is a cross-sectional view taken along a line X-X of the laminated glass illustrated in FIG. 1A.

Laminated glass 10A illustrated in FIG. 1 has a pair of glass plates 1A, 1B facing each other and an intermediate film 2A disposed so as to be sandwiched by the pair of glass plates 1A, 1B. The intermediate film 2A is constituted by laminating seven layers in the order of a skin layer 41, a core layer 31, a skin layer 42, a core layer 32, a skin layer 43, a core layer 33, and a skin layer 44 from the glass plate 1A side toward the glass plate 1B side. In the laminated glass 10A, the pair of glass plates 1A, 1B, and the three core layers 31, 32, 33 and the four skin layers 41, 42, 43, 44 constituting the intermediate film each have a principal surface with substantially the same shape and dimensions.

Here, in this embodiment, "substantially the same shape and dimensions" means to have the same shape and the same dimensions as viewed by people. In other cases, "substantially" also indicates the same meaning as above.

Hereinafter, each of the elements constituting the laminated glass 10A will be explained.

[Glass Plate]

Plate thicknesses of the pair of glass plates 1A, 1B in the laminated glass 10A can each be appropriately selected according to a use for the laminated glass 10A, materials of a glass plate to be used, an intermediate film to be combined therewith, and the like. The plate thicknesses of the glass plates 1A, 1B are each preferably a plate thickness which makes intermediate film mass % of the laminated glass 10A fall within the above-described preferable range. In consideration of these, the plate thicknesses of the glass plates 1A, 1B can each be set to 0.1 to 10 mm in general. Note that in order to make the surface density of the laminated glass 10A fall within the above-described preferable range, the plate thicknesses of the glass plates 1A, 1B are each preferably 0.3 to 2.5 mm.

The plate thicknesses of the pair of glass plates 1A, 1B may be the same as or different from each other. When the plate thicknesses are different in the glass plates 1A, 1B, the plate thickness of the glass plate located on an indoor side, for example, the glass plate located on a vehicle-interior side in window glass of an automobile, or on an indoor side in window glass of a building is preferably smaller than the plate thickness of the glass plate located on an outdoor side such as the vehicle exterior or the outdoors when the laminated glass 10 is installed in a window or the like.

For example, in a case where the laminated glass 10A is used for the window glass for automobile, when the glass plate located on the vehicle-interior side in use is set as the glass plate 1A, the plate thickness of the glass plate 1A is preferably 0.5 mm to 1.6 mm, and more preferably 0.7 mm to 1.5 mm. Further, the plate thickness of the glass plate 1A is preferably smaller than the plate thickness of the glass plate 1B. A difference between the plate thickness of the glass plate 1A and the plate thickness of the glass plate 1B is preferably 0.3 to 1.5 mm, and more preferably 0.5 to 1.3 mm. Further, in this case, the glass plate 1B is the glass plate located on a vehicle-exterior side, and the plate thickness thereof is preferably 1.6 mm to 2.5 mm, and more preferably 1.7 mm to 2.1 mm.

In use of the laminated glass for the window glass for automobile, the glass plate located on the vehicle-exterior side having a plate thickness larger than that of the glass plate located on the vehicle-interior side is preferable in terms of flying stone impact resistance. In particular, the plate thickness on the vehicle-exterior side is preferably 1.3 mm or more.

Examples of materials of the glass plates 1A, 1B used for the laminated glass 10A include transparent inorganic glass and organic glass (resin). As the inorganic glass, ordinary soda lime glass (also referred to as soda lime silicate glass), aluminosilicate glass, borosilicate glass, non-alkali glass, quartz glass and the like are used without any particular limitation. Among them, soda lime glass is particularly preferable. Its forming method is also not particularly limited and, for example, float plate glass formed by a float method or the like may be used. Further, the glass plates 1A, 1B have been preferably subjected to tempering such as thermally tempering or chemical tempering.

Examples of the organic glass (resin) include a polycarbonate resin, a polystyrene resin, an aromatic polyester resin, an acrylic resin, a polyester resin, a polyarylate resin, a polycondensate of halogenated bisphenol A and ethylene glycol, an acrylic urethane resin, a halogenated aryl group-containing acrylic resin and the like. Among them, the polycarbonate resin such as an aromatic polycarbonate resin and the acrylic resin such as a polymethyl methacrylate-based acrylic resin are preferable, and the polycarbonate resin is more preferable. Further, among the polycarbonate resins, a bisphenol A-based polycarbonate resin is particularly preferable. Note that the glass plate may be formed by containing two or more kinds of the above-described resins.

Further, the glass plates 1A, 1B may be glass plates with infrared absorbency and ultraviolet absorbency imparted by containing an infrared absorbent, an ultraviolet absorbent, and the like in the above-described inorganic glass or organic glass (resin). As such a glass plate, a green glass plate, an ultraviolet-absorbing (UV) green glass plate, or the like can be used. Note that the UV green glass plate indicates ultraviolet-absorbing green glass containing not less than 68 mass % nor more than 74 mass % of $SiO_2$, not less than 0.3 mass % nor more than 1.0 mass % of $Fe_2O_3$, and not less than 0.05 mass % nor more than 0.5 mass % of FeO, and having ultraviolet transmittance at a wavelength of 350 nm of 1.5% or less and a minimum value of transmittance in a region of not less than 550 nm nor more than 1700 nm.

As the above-described glass, a colorless and transparent material with no coloring component added thereto may be used, or a colored and transparent material colored like the above-described green glass within the range not impairing the effect of the present invention may be used. Moreover, in these sheets of glass, one kind may be used or two or more kinds of them may be used in combination, and for example, a laminated substrate may be made by laminating two or more layers. Though depending on the application place of the laminated glass, the inorganic glass is preferable as glass.

The pair of glass plates 1A, 1B used for the laminated glass 10A may be made of different kinds of materials from each other, but are preferably made of the same kind of material. A shape of the glass plates 1A, 1B may be flat or may entirely or partially have a curvature. In the glass plates 1A, 1B, a surface to be exposed to the atmosphere may be subjected to a coating that imparts a water repellent function, a hydrophilic function, an antifogging function and the like. Further, facing surfaces of the glass plates 1A, 1B facing each other may be subjected to functional coatings normally including metal layers such as a low-emissivity coating, an infrared shielding coating, and a conductive coating.

Note that in the case where the facing surfaces of the glass plates 1A, 1B have the above-described functional coatings, the following skin layers 41, 44 of the intermediate film 2A are constituted to be in contact with the functional coatings on the facing surfaces of the glass plates 1A, 1B.

[Intermediate Film]

The intermediate film 2A in the laminated glass 10A has a constitution in which seven layers are laminated in the order of the skin layer 41, the core layer 31, the skin layer 42, the core layer 32, the skin layer 43, the core layer 33, and the skin layer 44 from the glass plate 1A side toward the glass plate 1B side. The intermediate film 2A is disposed between the glass plates 1A and 1B, and has a function of bonding the glass plates 1A, 1B to integrate them as the laminated glass 10A.

Any of the core layers 31, 32, 33 and the skin layers 41, 42, 43, 44 is a layer containing the polyvinyl acetal resin and the plasticizer, and the glass transition point of each of the core layers 31, 32, 33 is lower than 15° C., and the glass transition point of each of the skin layers 41, 42, 43, 44 is 15° C. or higher. Hereinafter, the glass transition point of the core layer is sometimes referred to as Tgc, and the glass transition point of the skin layer is sometimes referred to as Tgs.

Tgc is preferably 10° C. or lower, and more preferably 8° C. or lower. When Tgc is lower than 15° C., desired sound insulating performance is obtained in the laminated glass. Tgc is preferably −10° C. or higher and more preferably 0° C. or higher from the viewpoint of shape retention of the core layer in itself.

Tgs is preferably 20° C. or higher, and more preferably 25° C. or higher. When Tgs is 15° C. or higher, desired sound insulating performance is obtained in the laminated glass. Tgs is preferably 50° C. or lower, and more preferably 40° C. or lower from the viewpoint of penetration resistance.

From the viewpoint of enhancing the sound insulating property, a value obtained by subtracting Tgc from Tgs is preferably 10 to 40° C., and more preferably 20 to 35° C.

The polyvinyl acetal resin and the plasticizer in the core layers 31, 32, 33 and the skin layers 41, 42, 43, 44 have glass transition points for each of the layers. That is, in order that the core layers each obtain the above-described Tgc and the skin layers each obtain the above-described Tgs, kinds of the polyvinyl acetal resin and the plasticizer and a content ratio between the polyvinyl acetal resin and the plasticizer are appropriately selected for each of the layers, to form the layers.

However, in the intermediate film 2A including these seven layers, the plasticizer amount in each of the layers is adjusted, so that a plasticizer amount becomes 0.3 mg/mm² or more in the region between a position of 5 mm inside from an end portion of the principal surface and a position of 6 mm inside from the end portion. The region between a position of 5 mm inside from the end portion and a position of 6 mm inside from the end portion in the intermediate film 2A is indicated by a dot pattern in FIG. 1A. In the intermediate film 2A, the region is the region (x).

As the polyvinyl acetal resin and the plasticizer which the core layers and the skin layers contain, a polyvinyl acetal resin and a plasticizer which are normally used for an intermediate film for laminated glass can be used without any particular limitation. The polyvinyl acetal resin is a high molecular compound obtained by making aldehyde (R—CHO; R is an alkyl group) react with polyvinyl alcohol to cause partial acetalization, and including polymer units each having a main chain of ethylene groups and the hydroxyl group, acetyl group, and acetal group bonded to the main chain.

The polyvinyl acetal resin has a degree of polymerization of polyvinyl alcohol, a kind of aldehyde, a content ratio of the hydroxyl group (mol % of the polymer unit having the hydroxyl groups in total polymer units), a degree of acetylation (mol % of the polymer unit having the acetyl groups in total polymer units), and a degree of acetalization (mol % of the polymer unit having the acetal groups in total polymer units), which are appropriately adjusted according to properties required as the intermediate film for laminated glass. As the polyvinyl acetal resin to be used for the present invention, a polyvinyl butyral resin (PVB) made by making n-butyraldehyde react with polyvinyl alcohol is preferable. In the polyvinyl acetal resin, only one kind may be used or two or more kinds may be used in combination. The polyvinyl acetal resins which the three core layers 31, 32, 33 and the four skin layers 41, 42, 43, 44 contain in the intermediate film 2A may be the same or may be different as long as Tgc and Tgs fall within the above-described ranges in each of the layers.

As the plasticizer which the core layers and the skin layers contain, a plasticizer which is normally used as a plasticizer for the polyvinyl acetal resin can be used without any particular limitation. Specifically, examples thereof include organic ester plasticizers such as monobasic organic acid ester and poly-basic organic acid ester, phosphoric acid plasticizers such as an organic phosphoric acid plasticizer and an organic phosphorous acid plasticizer, and the like. Among them, the organic ester plasticizer is preferable. Any of these plasticizers is soluble in THF, and the above-described measuring method for the plasticizer amount of the intermediate film can be applied thereto. In the plasticizer, only one kind may be used or two or more may be used in combination. The plasticizers which the three core layers 31, 32, 33 and the four skin layers 41, 42, 43, 44 contain in the intermediate film 2A may be the same or may be different as long as Tgc and Tgs fall within the above-described ranges in each of the layers.

The core layers and the skin layers are each mainly composed of the polyvinyl acetal resin and the plasticizer, and the glass transition points can be adjusted by the kinds of the polyvinyl acetal resin and the plasticizer and the content ratio between the polyvinyl acetal resin and the plasticizer. As long as Tgc in each layer of the core layers and Tgs in each layer of the skin layers fall within the respective above-described ranges in the intermediate film, and the plasticizer amount in the region (x) of the intermediate film is the above-described predetermined amount or more, the content ratio between the polyvinyl acetal resin and the plasticizer in each of the layers is not particularly limited. Specifically, in each of the layers, according to the glass transition points, the plasticizer amount of the intermediate film, and the other required properties, the content ratio is appropriately adjusted in a range of a ratio of about 20 to 90 parts by mass of the plasticizer to 100 parts by mass of the polyvinyl acetal resin. Examples of the other required properties include transparency, weather resistance, adhesive strength, penetration resistance, impact energy absorbency, moisture resistance, a heat shielding property, and the like according to a use for the laminated glass.

When the glass transition points are adjusted by the content ratio between the polyvinyl acetal resin and the plasticizer, in a case of using the same polyvinyl acetal resin, the larger content ratio of the plasticizer to the polyvinyl acetal resin is, the lower glass transition point is obtained. Accordingly, when the core layers and the skin layers are produced by using the same polyvinyl acetal resin, the content ratio of the plasticizer to the polyvinyl acetal resin is larger in the core layers than that in the skin layers.

Tgcs of three or more core layers which the intermediate film has may be the same or different as long as they fall within the above-described range in the core layers. Further, Tgss of a plurality of skin layers which the intermediate film has may be the same or different as long as they fall within the above-described range in the skin layers. The intermediate film is preferably constituted to have the same Tgc in the three or more core layers and to have the same Tgs in the plurality of skin layers. Furthermore, the intermediate film is preferably constituted to contain the same polyvinyl acetal resin and plasticizer so that Tgc becomes the same in the three or more core layers and to contain the same polyvinyl acetal resin and plasticizer so that Tgs becomes the same in the plurality of skin layers.

The intermediate film in the laminated glass of the present invention is constituted by alternately laminating the above-described core layers and the above-described skin layers and to have the above-described three or more core layers, and the plasticizer amount in the region (x) is 0.3 mg/mm$^2$ or more. The intermediate film has the plasticizer amount of 0.3 mg/mm$^2$ or more in the region (x) in the above-described laminated structure, thereby having an excellent sound insulating property when it is used for the laminated glass. From the viewpoint of improvement in a sound insulating property, the plasticizer amount in the region (x) of the intermediate film is preferably 0.5 mg/mm$^2$ or more, and more preferably 0.7 mg/mm$^2$ or more. On the other hand, from the viewpoints of foaming resistance and transparency, the plasticizer amount in the region (x) of the intermediate film is preferably 1.5 mg/mm$^2$ or less, and more preferably 1.0 mg/mm$^2$ or less.

The plasticizer amount in the region (x) of the intermediate film is a sum of plasticizer amounts [mg/mm$^2$] in regions corresponding to the region (x) of the intermediate film in principal surfaces of the layers constituting the intermediate film. The plasticizer amounts [mg/mm$^2$] in the regions of the layers can also be calculated by the product of the plasticizer amount [mg/mm$^3$] per unit volume of the region in each of the layers and a thickness [mm].

As long as the intermediate film satisfies the above-described essential conditions, the total number of layers is not particularly limited. The constitution with the smallest number of layers in the intermediate film is a constitution in which three core layers and two skin layers are alternately laminated. In that case, laminated glass has a laminated structure of a glass plate, a core layer, a skin layer, a core layer, a skin layer, a core layer, and a glass plate. From the viewpoint of workability at a time of manufacturing the laminated glass, the intermediate film is preferably constituted to have the skin layers so as to be in contact with facing surfaces of a pair of the glass plates.

The intermediate film mass % is preferably 13 mass % or more, and more preferably 14 mass % or more in a relationship between the intermediate film and the glass plates. Further, in the intermediate film, a thickness between a pair of core layers which are the closest to the pair of glass plates (hereinafter, it is also referred to as "a thickness between outermost core layers") is preferably 0.45 mm or more. Furthermore, in the intermediate film, a surface density of all of the layers which are disposed between the pair of core layers which are the closest to the pair of glass plates (hereinafter, it is also referred to as "a surface density between outermost core layers") is preferably 0.5 kg/m$^2$ or more.

A constitution with the smallest number of layers as the intermediate film having the laminated structure having the skin layers so as to be in contact with the facing surfaces of the pair of glass plates and having the three or more core layers is a constitution of the intermediate film 2A illustrated in FIG. 1B in which seven layers of the three core layers 31 to 33 and the four skin layers 41 to 44 are laminated in the order of the skin layer 41, the core layer 31, the skin layer 42, the core layer 32, the skin layer 43, the core layer 33, and the skin layer 44 from the glass plate 1A side. The three core layers and the four skin layers may have a single-layer structure or a multilayer structure as long as each of the core layers and the skin layers satisfies the above-described Tgc and Tgs.

The pair of core layers which are the closest to the pair of glass plates 1A, 1B in the intermediate film 2A are the core layer 31 which is the closest to the glass plate 1A and the core layer 33 which is the closest to the glass plate 1B. FIG. 1B illustrates a thickness between the core layer 31 and the core layer 33 as Ta and a thickness of the intermediate film 2A as Tb.

In the intermediate film 2A, the thickness Ta between the outermost core layers is a distance between surfaces facing each other of the core layer 31 and the core layer 33, and a sum of thicknesses of the skin layer 42, the core layer 32, and the skin layer 43. The thickness Ta between the outermost core layers is preferably 0.45 mm or more, and more preferably 0.50 mm or more from the viewpoint where the intermediate film undergoes sufficient shear deformation, thus increasing the sound insulating performance of the laminated glass. Though an upper limit of the thickness Ta between the outermost core layers is not particularly limited, Ta is preferably 4.0 mm or less, and more preferably 3.0 mm or less from the viewpoint of reduction in weight.

The surface density between the outermost core layers in the intermediate film 2A is a surface density in three layers obtained by laminating the skin layer 42, the core layer 32, and the skin layer 43. The surface density between the outermost core layers in the intermediate film is preferably 0.5 kg/m$^2$ or more, more preferably 0.55 kg/m$^2$ or more, and further preferably 0.6 kg/m$^2$ or more from the viewpoint where the intermediate film undergoes sufficient shear deformation, thus increasing the sound insulating performance of the laminated glass, similarly to the thickness Ta between the outermost core layers. Though an upper limit of the surface density between the outermost core layers is not particularly limited, the surface density is preferably 3.3 kg/m$^2$ or less, more preferably 2.0 kg/m$^2$ or less, and further preferably 1.3 kg/m$^2$ or less from the viewpoint of reduction in weight.

The thickness Tb of the intermediate film 2A is a sum of the thicknesses of the three core layers 31 to 33 and the four skin layers 41 to 44, and it is preferably 1.10 mm or more, more preferably 1.53 mm or more, and further preferably 2.0 mm or more from the points of setting the plasticizer amount in the region (x) of the intermediate film to fall within the above-described range and allowing the intermediate film mass % to fall within the above-described range and the viewpoint of the sound insulating property. Though an upper limit of the thickness Tb of the intermediate film 2A is not particularly limited, Tb is preferably 4.0 mm or less from the viewpoint of reduction in weight.

The thicknesses of the core layers 31, 32, 33 are not particularly limited. They are each preferably 0.05 to 0.2 mm, and more preferably 0.07 to 0.15 mm from the viewpoints of the sound insulating property and the reduction in weight of the laminated glass and setting the plasticizer amount in the region (x) of the intermediate film and Ta and Tb to fall within the above-described ranges, and so on. The thicknesses of the core layers 31, 32, 33 may be the same as or different from one another.

The thicknesses of the skin layers 41, 42, 43, 44 are not particularly limited. They are each preferably 0.05 to 1.1 mm, more preferably 0.2 to 0.76 mm, and further preferably 0.2 to 0.45 mm from the viewpoints of the sound insulating property and the reduction in weight of the laminated glass and setting the plasticizer amount in the region (x) of the intermediate film and Ta and Tb to fall within the above-described ranges, and so on. The thicknesses of the skin layers 41, 42, 43, 44 may be the same as or different from one another.

Here, FIG. 1B is a view illustrating a cross-section perpendicular to a principal surface of the laminated glass 10A, to show that the glass plates 1A, 1B and the intermediate film 2A are laminated each with a uniform thickness between from one end portion to the other end portion of the laminated glass. In the laminated glass 10A, all of the cross-sections perpendicular to the principal surface are the same. That is, in the laminated glass 10A, the thicknesses of the layers, and Ta and Tb are the same at any place in the principal surface. Further, as long as each layer of the core layers and the skin layers has no concentration difference (a difference of the plasticizer amount per unit volume) of the plasticizer in a principal surface direction, the plasticizer amount of the intermediate film is the same at any place in the principal surface including the region (x).

The number of core layers of the intermediate film in the laminated glass of the present invention is three or more. Though an upper limit of the number of core layers is not particularly limited, the number of core layers is preferably five layers or less from the viewpoint of easiness on manufacture of the intermediate film. Regardless of the number of core layers of the intermediate film, the laminated glass preferably has the skin layers so as to be in contact with the facing surfaces of the pair of glass plates.

For production of the core layers and the skin layers in the intermediate film, a resin composition containing the above-described polyvinyl acetal resin and plasticizer as a main component is used. The resin composition may contain components other than the polyvinyl acetal resin and the plasticizer, for example, one kind or two or more kinds of various additives such as an infrared absorbent, an ultraviolet absorbent, a fluorescer, an adhesion regulator, a coupling agent, a surface-active agent, an antioxidant, a heat stabilizer, a light stabilizer, a dehydrating agent, a defoaming agent, an antistatic agent, and a flame retarder within the range not impairing the effect of the present invention according to various purposes. These additives are entirely uniformly contained in each of the core layers and the skin layers.

Note that regarding the additives such as the infrared absorbent, the ultraviolet absorbent, and the fluorescer, in particular, among the above-described additives, which are contained for imparting additional functions to the core layer and the skin layer, for example, in the intermediate film 2A in the laminated glass 10A, in the layers of the intermediate film formed of seven layers in total of the three core layers 31 to 33 and the four skin layers 41 to 44, only one layer or two or more layers may contain the additives, and furthermore, when two or more layers contain the additives, the two or more layers may contain the same kind of additive in the same amount or in different amounts, and may contain the different additives from one another.

The intermediate film 2A is produced by, for example, preparing the core layers 31, 32, 33 and the skin layers 41, 42, 43, 44 formed into sheet shapes from the resin compositions suitable for the respective layers such that the thicknesses of the layers in the intermediate film when they are finally formed into the laminated glass preferably fall within the above-described ranges, laminating the obtained layers in the order of the skin layer 41, the core layer 31, the skin layer 42, the core layer 32, the skin layer 43, the core layer 33, and the skin layer 43, and heating them under pressure. Alternatively, the intermediate film 2A may be integrally produced by coextrusion. Conditions of the pressing, the heating, and the like and a condition of the coextrusion at a time of the lamination can be similar to those in a case where a conventional three-layer intermediate film is produced by, for example, using the resin composition for intermediate film containing the polyvinyl acetal resin and the plasticizer.

The intermediate film in the laminated glass of the present invention has been described above by exemplifying the intermediate film 2A in the case where three core layers are provided. Also in an intermediate film in the case where four or more core layers are provided, the core layer and the skin layer only need to be designed appropriately similarly to the above so that the plasticizer amount in the region (x) falls within the range of the present invention. Also in the intermediate film in the case where four or more core layers are provided, the core layer and the skin layer only need to be designed appropriately similarly to the above while considering so that the intermediate film mass %, the thickness Ta between the outermost core layers, the surface density between the outermost core layers, and the thickness Tb of the intermediate film fall within the above-described preferable ranges.

The intermediate film in the laminated glass of the present invention may be the one where the layers each have a uniform thickness in the principal surface of the laminated glass as in the intermediate film 2A, or may be the one where the layers have different thicknesses in the principal surface. In that case, the thicknesses of the layers, the thickness Ta between the outermost core layers, and the thickness Tb of the intermediate film are preferably designed such that a value measured at a place where the thickness of the intermediate film is the largest falls within the range when the layers each have the uniform thickness in the principal surface of the laminated glass as described above, specifically, the range illustrated in the intermediate film 2A. Besides, the intermediate film mass % and the surface density are physical properties measured with respect to the entire laminated glass as described above.

Note that when the thickness (total thickness) of the intermediate film is different in the principal surface, the portion where the thickness of the intermediate film is the smallest in the range of 5 to 6 mm inside from the end portion of the intermediate film becomes the region (x) where the plasticizer amount is measured. Then, the plasticizer amount of the intermediate film is designed so that a value measured in the region (x) is the same as that in the range when a total thickness of the intermediate film has a uniform thickness in the principal surface of the above-described laminated glass. Further, when the thickness (total thickness) of the intermediate film is different in the principal surface, the thickness of the intermediate film in a portion where a thickness as the entire intermediate film is the smallest is preferably 1.0 mm or more, and preferably 1.5 mm or more.

Figure 2A:
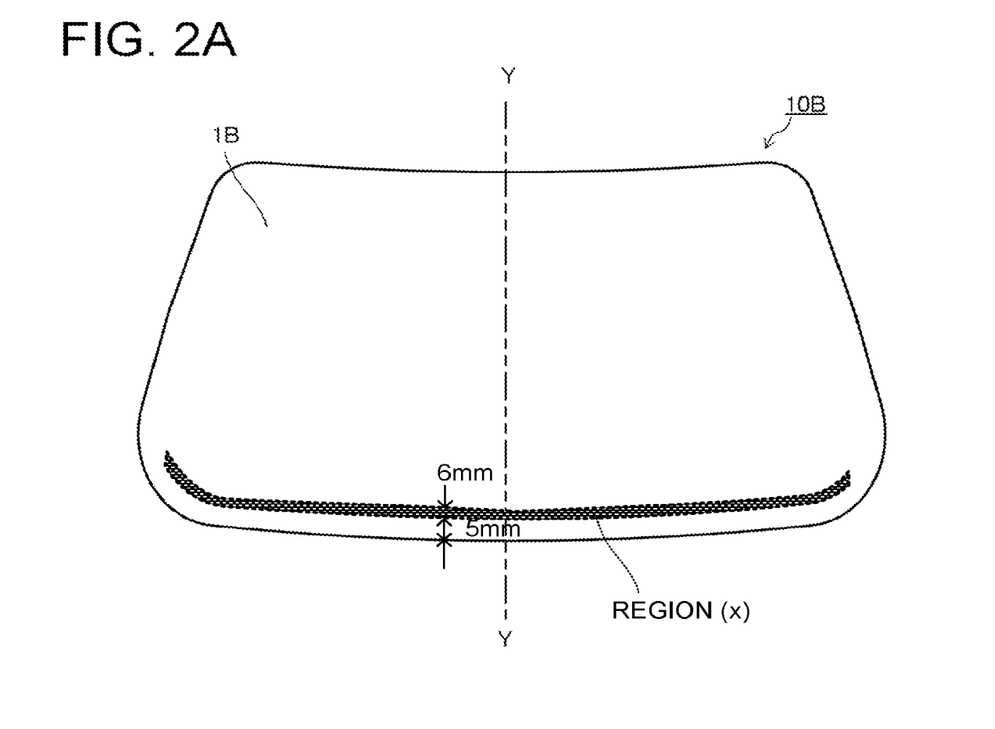
FIG. 2A is a front view of still another example of the embodiment of the laminated glass of the present invention.
Figure 2B:
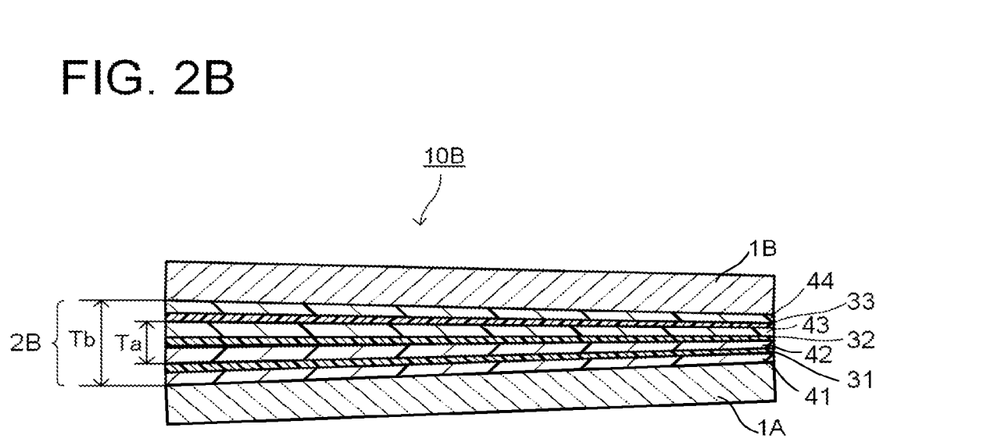
FIG. 2B is a cross-sectional view taken along a line Y-Y of the laminated glass illustrated in FIG. 2A.

FIG. 2A is a front view of another example of the embodiment of the laminated glass of the present invention using the seven-layer laminated film as the intermediate film, and FIG. 2B is a cross-sectional view taken along a line Y-Y of the laminated glass illustrated in FIG. 2A. Laminated glass 10B illustrated in FIG. 2A is the laminated glass used as, for example, a windshield of an automobile. In FIG. 2A, an upper side of the laminated glass 10B is attached to the automobile as an upper side of the windshield. Hereinafter, an edge on the upper side of the laminated glass 10B is referred to as an upper edge, and an edge on the lower side is referred to as a lower edge. In the cross-sectional view of the laminated glass 10B illustrated in FIG. 2B, the left side is the upper edge side, and the right side is the lower edge side.

As illustrated in FIG. 2A, a principal surface of the laminated glass 10B has a shape of a substantially trapezoid having a lower edge longer than an upper edge. As illustrated in FIG. 2B, an intermediate film 2B which the laminated glass 10B has is the intermediate film in so-called a wedge shape gradually reduced in thickness from the upper edge toward the lower edge. A laminated constitution of the intermediate film 2B is a seven-layer constitution where the skin layer 41, the core layer 31, the skin layer 42, the core layer 32, the skin layer 43, the core layer 33, and the skin layer 44 are laminated in the order from the glass plate 1A side toward the glass plate 1B side. Any of the skin layer 41, the core layer 31, the skin layer 42, the core layer 32, the skin layer 43, the core layer 33, and the skin layer 43 is formed to gradually reduce the thickness at the same rate from the upper edge toward the lower edge.

Usually, in such a laminated glass, the thickness of the intermediate film and each of the layers constituting the intermediate film is fixed from one end portion toward the other end portion in the upper edge, and the thickness of the intermediate film and each of the layers constituting the intermediate film is fixed from one end portion toward the other end portion in the lower edge.

In the laminated glass 10B, a place where the thickness of the intermediate film 2B is the largest is the upper edge. FIG. 2B illustrates measurement places of the thickness Ta between the outermost core layers and the thickness Tb of the intermediate film 2B in the intermediate film 2B. In the intermediate film 2B, the similar thicknesses to those in the intermediate film 2A can be applied as Ta and Tb measured at the upper edge. Further, the similar thicknesses to those in the intermediate film 2A can be applied as the thicknesses at the upper edge being the place where the thicknesses are the largest regarding thicknesses of the layers in the intermediate film 2B similarly to Ta and Tb.

In the laminated glass 10B, the plasticizer amount of the intermediate film 2B is measured at a portion where the thickness of the intermediate film is the smallest in a range of 5 to 6 mm inside from an end portion of the intermediate film 2B. The portion where the thickness of the intermediate film is the smallest in the range of 5 to 6 mm inside from the end portion of the intermediate film 2B is a range of 5 to 6 mm inside from the lower edge of the intermediate film 2B, and illustrated by the dot pattern in FIG. 2A. In the intermediate film 2B, the region is the region (x) where the plasticizer amount is measured. The plasticizer amount of the intermediate film 2B is designed so that a value measured in the region (x) is the same as that in the range when a total thickness in the intermediate film has a uniform thickness in the principal surface of the above-described laminated glass, namely in a case of the intermediate film 2A.

In the laminated glass, generally, the intermediate film is sometimes used while partially extended according to the shape of the principal surface of the laminated glass. In that case, the thickness of the intermediate film at the extended part becomes smaller than the thickness of the intermediate film at a not-extended part. Also in such a case, similarly to a case of the above-described wedge-shaped intermediate film, the thicknesses of the layers, the thickness Ta between the outermost core layers, and the thickness Tb of the intermediate film are designed such that the values each measured at the place where the thickness of the intermediate film is the largest fall within the range when the layers each have the uniform thickness in the principal surface of the above-described laminated glass, specifically, within the range illustrated by using the intermediate film 2A. Further, the portion where the thickness of the intermediate film is the smallest in the range of 5 to 6 mm inside from the end portion of the intermediate film becomes the region (x) where the plasticizer amount is measured. Then, the plasticizer amount of the intermediate film is designed so that a value measured in the region (x) is the same as that in the range when a total thickness of the intermediate film has a uniform thickness in the principal surface of the above-described laminated glass.

The intermediate film in the laminated glass of the present invention preferably has a storage modulus G' of $5.0 \times 10^4$ Pa or more, and more preferably $1.0 \times 10^5$ Pa or more measured at a frequency of 1 Hz and a temperature of 20° C. The storage modulus G' is an index indicating rigidity of the intermediate film, and as long as the storage modulus G' of the intermediate film is within the above range, sufficient rigidity can be secured.

An upper limit of the storage modulus G' of the intermediate film is not particularly limited. However, when the storage modulus G' of the intermediate film becomes high, the sound insulating performance of the laminated glass may damaged. Besides, when the storage modulus G' of the intermediate film is too high, productivity may decrease such as needing a specific device in process of cutting or the like. Further, the intermediate film may become brittle to decrease penetration resistance. Considering such points, the storage modulus G' of the intermediate film is preferably $1.0 \times 10^7$ Pa or less. Note that the storage modulus G' of the intermediate film in this embodiment is a storage modulus in a dynamic viscoelasticity test measured under conditions of a frequency of 1 Hz, a temperature of 20° C., and a dynamic shear strain of 0.015% by a shearing method, for example, by using Rheometer MCR 301 manufactured by Anton Paar GmbH.

[Laminated Glass]

The laminated glass of the present invention includes a pair of glass plates facing each other, and an intermediate film having the above-described constitution sandwiched between the pair of glass plates, where the intermediate film mass % is preferably within the above-described range. The surface density of the laminated glass is also as described above. In the present invention, the above-described glass plates and intermediate film are preferably appropriately combined so that the intermediate film mass % and the surface density fall within the above-described ranges as the obtained laminated glass.

The laminated glass of the present invention has high sound insulating performance due to the above-described constitution. Specifically, the laminated glass of the present invention preferably has a loss coefficient of 0.35 or more at a primary resonance point measured in a frequency domain of 0 to 10000 Hz under the condition of a temperature of 20° C. Hereinafter, the primary resonance point refers to a primary resonance point measured in a frequency domain of 0 to 10000 Hz under the condition of a temperature of 20° C. unless otherwise specified.

Note that the loss coefficient at the primary resonance point can be measured by a central exciting method based on ISO_PAS_16940. As a measurement apparatus for the loss coefficient by the central exciting method, for example, a central exciting method measurement system (MA-5500, DS-2000) manufactured by ONO SOKKI Co., Ltd. can be exemplified. The frequency domain of the primary resonance point in the laminated glass of the present invention is about 0 to 300 Hz. The laminated glass of the present invention, having the loss coefficient at the primary resonance point of 0.35 or more, can sufficiently insulate sound in a relatively low frequency domain, such as, for example, engine sound and vibration sound of tires of an automobile. Further, the laminated glass of the present invention, having the loss coefficient at the primary resonance point of 0.35 or more, can efficiently insulate sound from a low frequency domain to a high frequency domain because the loss coefficients at higher-order resonance points such as a secondary resonance point to a seventh-order resonance point are also likely to be relatively high, for example, 0.35 or more.

In the laminated glass of the present invention, the loss coefficient at the primary resonance point is more preferably 0.40 or more, further preferably 0.42 or more, and particularly preferably 0.45 or more. Further, in the laminated glass of the present invention, the loss coefficients are particularly preferably 0.5 or more at both the primary resonance point and the secondary resonance point. Note that, for example, in laminated glass in a curved shape, the loss coefficient is measured by producing laminated glass using flat glass plates to have the constitution equivalent to that of the laminated glass in the curved shape.

The laminated glass of the present invention has foaming resistance of the intermediate film, particularly high foaming resistance in the peripheral edge portion of the intermediate film due to the above-described constitution. For example, the laminated glass of the present invention hardly generates bubbles in the entire region including the peripheral edge portion of the intermediate film even though it undergoes long-time ultraviolet radiation.

Specifically, when the laminated glass of the present invention is subjected to the weather resistance test in which simulated solar rays are irradiated for 3000 hours under conditions of a black panel temperature (BPT) of 83° C. and no rainfall by using a sunshine carbon arc lamp-type weather resistance test device (SWOM, manufactured by Suga Test Instruments Co., Ltd.), no bubble is generated in the entire region including the peripheral edge portion of the intermediate film.

Furthermore, the laminated glass of the present invention preferably has a three-point bending rigidity of 100 N/mm or more. The three-point bending rigidity is rigidity obtained by a three-point bending test, and can be measured by, for example, a compression and tensile testing machine. The three-point bending rigidity is particularly preferably 120 N/mm or more. The three-point bending rigidity of the laminated glass of 100 N/mm or more is preferable because it is the rigidity at a level not inhibiting opening/closing of the window glass during high-speed running of a vehicle.

The laminated glass of the present invention preferably also has a sound transmission loss of 35 dB or more in a coincidence region measured based on SAE J1400, and particularly preferably 42 dB or more. The laminated glass having the sound transmission loss of 35 dB or more can be evaluated to be excellent in the sound insulating property.

(Another Layer)

The laminated glass in the embodiment may have a functional film between the pair of glass plates as another layer within the range not impairing the effect of the present invention. When the functional film is included, for example, a constitution where the functional film is sandwiched between the layers of the intermediate film constituted by the plurality of layers as stated above is preferable.

As the functional film, there can be cited, for example, an infrared shielding film and the like. As the infrared shielding film, specifically, there can be cited the one in which a conventionally known infrared reflective film such as a single-layer or multilayer infrared reflective film having a film thickness of about 100 to 500 nm and including a dielectric multilayer film, a liquid crystal alignment film, an infrared reflector-containing coating film, and a metal film is formed as an infrared reflective film on a supporting film such as a polyethylene terephthalate (PET) film having a thickness of about 25 to 200 μm. As the infrared shielding film, furthermore, there can be cited a dielectric multilayer film, or the like made by laminating resin films different in refractive index and having a total film thickness of about 25 to 200 μm.

When the laminated glass of the present invention has the functional film, and the functional film exists between the outermost core layers, the thickness Ta between the outermost core layers and the surface density between the outermost core layers are measured and calculated under a state where the functional film is included. Further, the plasticizer amount in the region (x) of the intermediate film, the thickness Tb of the intermediate film, and the intermediate film mass % are measured and calculated while the functional film is excluded, and the surface density of the laminated film is calculated under the state where the functional film is included.

The laminated glass of the embodiment may have, for example, a black ceramic layer arranged in a band shape at a part or all of a peripheral edge portion of the laminated glass as another layer for a purpose of hiding portions attached to a frame body or the like of the laminated glass, a wiring conductor and so on. A width of the black ceramic layer is appropriately selected according to uses of the laminated glass. For example, when the laminated glass is roof glass used for a ceiling part of an automobile, the black ceramic layer is usually formed in a frame shape having a width of about 10 to 100 mm. Further, when the laminated glass is used for side glass of the automobile, the black ceramic layer is sometimes formed in a band shape usually having a width of about 30 to 200 mm.

The black ceramic layer can be formed into the above-described shape by an ordinary method on the principal surface on the atmosphere side or the intermediate film side of either one of the pair of glass plates which the laminated glass has, for example. The formation place of the black ceramic layer is appropriately selected according to the use. Note that when the laminated glass of the present invention has the black ceramic layer, the intermediate film mass % is measured and calculated while excluding the black ceramic layer, and the surface density of the laminated glass is calculated under a state where the black ceramic layer is not included.

Note that "black" of the black ceramic layer does not mean, for example, black defined by three attributes of color or the like, but includes a range where it is recognizable as black adjusted to inhibit visible light from being transmitted to an extent capable of hiding at least a portion required to be hidden. Accordingly, in the black ceramic layer, the black may have gradation as necessary within a range in which the black can fulfill this function, and a color shade of the black may be slightly different from the black defined by three attributes of color. From the same viewpoint, the black ceramic layer may be constituted to be an integrated film in which the entire layer continues or may be formed of dot patterns or the like in which the percentage of visible light transmission can be easily adjusted by the setting of the shape, arrangement or the like, according to the place where the black ceramic layer is arranged.

Further, the laminated glass of this embodiment may have a shade region. When the laminated glass is laminated glass for a vehicle, in particular, a windshield, a band-shaped shade region is sometimes formed which is colored in green, blue, and so on for improvement of antiglare property, heat shielding property and so on. The shade region is sometimes provided on the surface of the glass plate but often formed by coloring the intermediate film in a band shape. On the other hand, since there is a legal visual field area where the visible light transmittance is to be set to a predetermined value or more (for example, 70% or more), the shade region of the windshield is usually arranged on an upper portion of the windshield that is outside the visual field area.

[Manufacture of Laminated Glass]

The laminated glass of the embodiment of the present invention can be manufactured by a generally used publicly-known technology. Before compression bonding of the laminated glass 10A, a laminated glass precursor is prepared, including the glass plate 1A, the intermediate film 2 (the skin layer 41 is located on the glass plate 1A side), and the glass plate 1B laminated in this order. As described above, the intermediate film 2A can be formed by laminating the skin layer 41, the core layer 31, the skin layer 42, the core layer 32, the skin layer 43, the core layer 33, and the skin layer 44, in this order. The intermediate film 2A also can be produced by coextrusion of the layers. The intermediate film 2A is disposed between the pair of glass plates 1A and 1B to form the laminated glass precursor. Also in the case of having another layer, the glass plates and the layers are laminated in an order similar to these of the obtained laminated glass to prepare a laminated glass precursor.

This laminated glass precursor is put in a vacuum bag such as a rubber bag, this vacuum bag is connected to an exhaust system, and the laminated glass precursor is subjected to bonding at a temperature of about 70 to 110° C. while pressure-reduction suction (deaeration) was being performed to bring the inside of the vacuum bag into a pressure reduction degree of about −65 to −100 kPa, thereby allowing the laminated glass in the embodiment to be obtained. Furthermore, for example, the laminated glass precursor is subjected to compression bonding by heating and pressurizing under conditions of 100 to 140° C. and a pressure of 0.6 to 1.3 MPa, thereby allowing laminated glass further excellent in durability to be obtained. In a manufacturing process, an embossed shape may be provided on a surface of the intermediate film in advance so that the glass plates and the intermediate film closely adhere to one another without a gap.

The use of the laminated glass of the present invention is not particularly limited. The laminated glass can be used as laminated glass for building, laminated glass for an automobile and the like, and can attain more prominent sound insulating effect when it is used as the laminated glass for an automobile. Furthermore, the reduction in weight can be attained in preferable aspect.

Note that the laminated glass of the present invention, when used for an automobile, preferably has a visible light transmittance of 70% or more, and more preferably 74% or more measured according to JIS R3212 (1998). Tts (Total solar energy transmitted through a glazing) measured according to ISO13837-2008 is preferably 66% or less, and more preferably 60% or less.

EXAMPLES

Hereinafter, the present invention will be described in more detail using examples. The present invention is not limited to the embodiments and examples described below. Examples 1, 2 are examples, and Example 3 is a comparative example.

Example 1

Laminated glass of Example 1 having a constitution listed in Table 1 was manufactured as described below and evaluated. Note that the laminated glass of Example 1 has a similar constitution to that of the laminated glass 10A illustrated in FIGS. 1A, 1B.

(Manufacture or Preparation of Intermediate Film)

The intermediate film having a seven-layer laminated constitution listed in Table 1 was manufactured. Note that the same PVB sheet (Tgs; 30° C., PVB and a plasticizer were contained in a mass ratio 70:30) except the thickness was used for every skin layer in the intermediate film. Besides, the PVB sheet (Tgc; 3° C., PVB and a plasticizer were contained in a mass ratio 60:40) having a thickness of 0.1 mm was used for every core layer.

Note that the intermediate film was manufactured by laminating the PVB sheets forming the layers and pressing them by a hot press forming machine at 150° C., for 300 seconds, at a press pressure of 50 kg/cm$^2$. The thicknesses of the layers are thicknesses after the pressing.

The intermediate film of the laminated glass of Example 1 has three core layers, and a thickness Ta between the outermost core layers is a sum of thicknesses of the skin layer 43, the core layer 32, and the skin layer 42 of 0.66+0.1+0.66=1.42 mm. A surface density between the outermost core layers is 1.56 kg/m$^2$. A thickness Tb of the intermediate film is 2.28 mm which is a sum of the thicknesses of the above-described layers of (0.33+0.1+0.66+0.1+0.66+0.1+0.33).

The obtained intermediate film was an intermediate film having a uniform plasticizer amount in a principal surface direction. A part of the obtained intermediate film was cut along a face perpendicular to a principal surface, and a plasticizer amount [mg/mm$^2$] per unit area in the principal surface was measured by the above-described method. Note that the obtained plasticizer amount [mg/mm$^2$] is the same as the plasticizer amount [mg/mm$^2$] in the region (x) in the intermediate film of the laminated glass.

(Manufacture of Laminated Glass)

The intermediate film which was manufactured or prepared as described above was laminated between the glass plates 1A, 1B with the plate thicknesses listed in Table 1 to be sandwiched, and the glass plate 1A, the intermediate film 2B, and the glass plate 1B were laminated so as to be the similar constitution to that of the laminated glass 10A in FIGS. 1A, 1B, to create a laminate. This laminate was put in a vacuum bag and subjected to compression bonding at 110° C. while deaeration was being performed so as to bring the inside of the vacuum bag into a pressure reduction degree of −60 kPa or less, and then subjected to further compression bonding under conditions of a temperature of 140° C. and a pressure of 1.3 MPa, thereby obtaining the laminated glass. Note that all of the used glass plates were soda lime glass (25 mm×300 mm), and the intermediate film was used for lamination by making a size into the same size as the glass plates in advance.

Example 2

Laminated glass of Example 2 having a constitution listed in Table 1 was manufactured in a similar manner to that of Example 1 except to adjust a mass ratio between PVB and a plasticizer in each of skin layers and core layers in an intermediate film, and thicknesses of the layers.

A PVB sheet (Tgs; 32° C., PVB and a plasticizer were contained in a mass ratio 75:25) was used as each of the skin layers in the intermediate film. Note that thicknesses (after pressing) of the skin layers were set to thicknesses listed in Table 1. Further, as the core layers in the intermediate film, the same ones as those of Example 1 except for thicknesses were used. Note that the thicknesses (after pressing) of the core layers were set to thicknesses listed in Table 1.

The intermediate film of the laminated glass of Example 2 has three core layers, and a thickness Ta between the outermost core layers is a sum of thicknesses of the skin layer 43, the core layer 32, and the skin layer 42 of 0.4+0.08+0.4=0.88 mm. A surface density between the outermost core layers is 0.97 kg/m$^2$. A thickness Tb of the intermediate film is 1.14 mm which is a sum of the thicknesses of the above-described layers of (0.05+0.08+0.4+0.08+0.4+0.08+0.05).

Also in Example 2, similarly to Example 1, the obtained intermediate film was an intermediate film having a uniform plasticizer amount in a principal surface direction. A part of the obtained intermediate film was cut along a face perpendicular to a principal surface, and a plasticizer amount [mg/mm$^2$] per unit area in the principal surface was measured by the above-described method. Note that the obtained plasticizer amount [mg/mm$^2$] is the same as the plasticizer amount [mg/mm$^2$] in the region (x) in the intermediate film of the laminated glass.

Example 3

A three-layer intermediate film obtained by sandwiching one core layer between two skin layers in a laminated constitution listed in Table 1 was manufactured. Note that as each of two skin layers 41, 42 in the intermediate film of Example 3, the same one as the skin layer 41 of Example 1 was used, and as the core layer, the same one as the core layer of Example 1 was used. The intermediate film was obtained in a similar manner to that of Example 1, and laminated glass was manufactured in a similar manner to that of Example 1 by using this intermediate film. Note that the intermediate film in Example 3 was an intermediate film having a uniform plasticizer amount in a principal surface direction, and a part of the intermediate film was cut along a face perpendicular to a principal surface, and a plasticizer amount [mg/mm$^2$] per unit area in the principal surface was measured by the above-described method. The obtained plasticizer amount [mg/mm$^2$] is the same as the plasticizer amount [mg/mm$^2$] in the region (x) in the intermediate film of the laminated glass.

Table 1 lists a plasticizer amount [mg/mm$^2$] in a region (x) of the intermediate film, the number of core layers of the intermediate film, a thickness Ta between outermost core layers, a surface density between the outermost core layers, a thickness Tb of the intermediate film, a laminated glass surface density, and intermediate film mass % in the laminated glass obtained in each of Examples.

(Evaluation)

The foaming resistance and the sound insulating property of the laminated glass obtained in each of Example 1, 2, 3 were measured as described below. Table 2 lists results thereof.

(1) Foaming Resistance

The laminated glass obtained in each of Examples was subjected to a weather resistance test in which simulated solar rays were irradiated for 3000 hours under conditions of a black panel temperature (BPT) of 83° C. and no rainfall by using a sunshine carbon arc lamp-type weather resistance test device (SWOM, manufactured by Suga Test Instruments Co., Ltd.).

The presence or absence of generation of bubbles in the intermediate film was visually observed after the test. No foaming was confirmed in Example 1 and Example 2. Bubbles were generated from an end portion of the intermediate film toward center sides of the glass plates in Example 3. Among the generated bubbles, regarding the one in which a distance from the end portion of the intermediate film to a tip of the bubble on the glass plate center sides was maximum, the distance was measured and set as a diameter [mm] of the bubble.

(2) Sound Insulating Property

Regarding the laminated glass obtained in each of Examples, the loss coefficient at the primary resonance point at a frequency of 0 to 10000 Hz and at a temperature of 20° C. was measured based on ISO_PAS_16940, by using the central exciting method measurement system (MA-5500, DS-2000) manufactured by ONO SOKKI Co., Ltd.

TABLE 1

|  |  | Example | | |
|---|---|---|---|---|
|  |  | 1 | 2 | 3 |
| Glass plate thickness [mm] | Glass plate 1A | 2.0 | 1.8 | 2.0 |
|  | Glass plate 1B | 2.0 | 1.6 | 2.0 |
| Laminated constitution of intermediate film/each layer thickness [mm] | Skin layer 41 | 0.33 | 0.05 | 0.33 |
|  | Core layer 31 ($T_{31}$) | 0.10 | 0.08 | 0.10 |
|  | Skin layer 42 | 0.66 | 0.40 | 0.33 |
|  | Core layer 32 ($T_{32}$) | 0.10 | 0.08 | — |
|  | Skin layer 43 | 0.66 | 0.40 | — |
|  | Core layer 33 ($T_{33}$) | 0.10 | 0.08 | — |
|  | Skin layer 44 | 0.33 | 0.05 | — |
|  | Total thickness (Tb) | 2.28 | 1.14 | 0.76 |
| Plasticizer amount [mg/mm$^2$] in region (x) | | 0.72 | 0.33 | 0.24 |
| The number of core layers | | 3 | 3 | 1 |
| Between outermost core layers | Thickness Ta [mm] | 1.42 | 0.88 | 0 |
|  | Surface density [kg/m$^2$] | 1.56 | 0.97 | 0 |
| Laminated glass | Surface density [kg/m$^2$] | 12.51 | 9.3 | 10.84 |
|  | Intermediate film mass % | 20.1 | 13.6 | 7.7 |
| Evaluation | Diameter of bubble [mm] | No foaming | No foaming | 3.0 |
|  | Loss coefficient | 0.47 | 0.35 | 0.27 |

It is obvious from Table 1 that the laminated glasses of the examples are excellent in the foaming resistance and the sound insulating property.

What is claimed is:

1. A laminated glass comprising:
    a first glass plate and a second glass plate facing each other; and
    an intermediate film disposed between the first glass plate and the second glass plate and consisting of three or four core layers, two to five skin layers alternately laminated with the core layers, and optionally an infrared shielding film,
    wherein the intermediate film has a wedge shape such that a thickness of the intermediate film is gradually reduced from an upper edge toward a lower edge,
    a thickness of the intermediate film at the upper edge is 1.53 mm or more,
    each of the core layers and the skin layers contains a polyvinyl acetal resin and a plasticizer,
    each of the core layers has a glass transition point of lower than 15° C.,
    each of the skin layers has a glass transition point of 15° C. or higher, and
    the plasticizer is included in the core layers and the skin layers such that a surface density of the plasticizer in the intermediate film in a region within 5-6 mm from the lower edge of the intermediate film is 0.3 mg/mm$^2$ or more.

2. The laminated glass according to claim 1, wherein the thickness of the intermediate film at the upper edge is 2.0 mm or more.

3. The laminated glass according to claim 1, wherein a ratio of a mass of the intermediate film to a total mass of the intermediate film and the first glass plate and the second glass plate is 13 mass % or more.

4. The laminated glass according to claim 1, wherein the skin layers include a first skin layer in contact with the first glass plate, and a second skin layer in contact with the second glass plate,
    the core layers include a first core layer closest to the first glass plate, and a second core layer closest to the second glass plate, and
    a thickness between the first core layer and the second core layer is 0.45 mm or more.

5. The laminated glass according to claim 1, wherein the skin layers include a first skin layer in contact with the first glass plate, and a second skin layer in contact with the second glass plate,
    the core layers include a first core layer closest to the first glass plate, and a second core layer closest to the second glass plate, and
    a surface density of total layers between the first core layer and the second core layer is 0.5 kg/m$^2$ or more.

6. The laminated glass according to claim 1, wherein the laminated glass has a loss coefficient of 0.35 or more at a primary resonance point in a frequency of 0 to 10000 Hz and under a temperature of 20° C.

7. The laminated glass according to claim 1, wherein the intermediate film consists of three or four core layers, and two to five skin layers alternately laminated with the core layers, and does not have the infrared shielding film.

8. The laminated glass according to claim 1, wherein the intermediate film consists of three core layers, four skin layers alternately laminated with the core layers, and the infrared shielding film.

9. The laminated glass according to claim 1, wherein the intermediate film consists of three core layers and four skin layers alternately laminated with the core layers, and does not have the infrared shielding film.

10. The laminated glass according to claim 1, wherein the intermediate film consists of three or four core layers, four or five skin layers alternately laminated with the core layers, and the infrared shielding film,
    the skin layers include a first skin layer in contact with the first glass plate, and a second skin layer in contact with the second glass plate,
    the core layers include a first core layer closest to the first glass plate, and a second core layer closest to the second glass plate, and
    the infrared shielding film is provided between the first core layer and the second core layer.

11. The laminated glass according to claim 1, wherein the thickness of the intermediate film at the upper edge is 2.0 mm or more and 4.0 mm or less.

12. The laminated glass according to claim 1, wherein the infrared shielding film comprises a dielectric multilayer film, a liquid crystal alignment film, an infrared reflector-containing coating film, and a metal film.

13. The laminated glass according to claim 1, wherein the infrared shielding film has a thickness of 100 to 500 nm.

14. The laminated glass according to claim 1, wherein the skin layers include a first skin layer in contact with the first glass plate, and a second skin layer in contact with the second glass plate.

* * * * *